United States Patent
Nelapati et al.

(10) Patent No.: US 12,260,749 B2
(45) Date of Patent: Mar. 25, 2025

(54) METHODS AND SYSTEMS FOR SENSOR FUSION FOR TRAFFIC INTERSECTION ASSIST

(71) Applicant: GM GLOBAL TECHNOLOGY OPERATIONS LLC, Detroit, MI (US)

(72) Inventors: Praneeth Nelapati, Novi, MI (US); Jeffrey A. Clark, Macomb Township, MI (US); Kevin Hoang, Rochester Hills, MI (US)

(73) Assignee: GM GLOBAL TECHNOLOGY OPERATIONS LLC

( * ) Notice: Subject to any disclaimer, the term of this patent is extended or adjusted under 35 U.S.C. 154(b) by 253 days.

(21) Appl. No.: 18/162,151

(22) Filed: Jan. 31, 2023

(65) Prior Publication Data

US 2024/0257636 A1    Aug. 1, 2024

(51) Int. Cl.
| | | |
|---|---|---|
| *G08G 1/01* | (2006.01) | |
| *B60W 60/00* | (2020.01) | |
| *G08G 1/04* | (2006.01) | |
| *G08G 1/052* | (2006.01) | |

(52) U.S. Cl.
CPC ......... *G08G 1/0145* (2013.01); *B60W 60/001* (2020.02); *G08G 1/0125* (2013.01); *G08G 1/04* (2013.01); *G08G 1/052* (2013.01)

(58) Field of Classification Search
CPC ...... G08G 1/0145; G08G 1/0125; G08G 1/04; G08G 1/052; B60W 60/001
USPC ........................................................ 701/117
See application file for complete search history.

(56) References Cited

U.S. PATENT DOCUMENTS

| | | | | |
|---|---|---|---|---|
| 2014/0204209 A1* | 7/2014 | Huth | .................... | G06V 20/588 |
| | | | | 348/148 |
| 2018/0112997 A1* | 4/2018 | Fasola | ................ | G01C 21/3407 |
| 2021/0166145 A1* | 6/2021 | Omari | .................. | G08G 1/0129 |
| 2021/0201057 A1* | 7/2021 | Lin | .......................... | G06F 18/24 |
| 2022/0114888 A1* | 4/2022 | Napanda | .............. | G08G 1/0112 |
| 2022/0242423 A1* | 8/2022 | Heitzmann | ....... | B60W 50/0097 |
| 2022/0327843 A1* | 10/2022 | Belman | ................ | G06V 20/588 |
| 2022/0402492 A1* | 12/2022 | Sakakura | ............. | G06V 20/584 |

(Continued)

OTHER PUBLICATIONS

Campbell et al., "Traffic Light Status Detection Using Movement Patterns of Vehicles", 2016 (Year: 2016).*

(Continued)

*Primary Examiner* — Hussein Elchanti
*Assistant Examiner* — Kenneth M Dunne
(74) *Attorney, Agent, or Firm* — Lorenz & Kopf LLP (57) ABSTRACT

Systems and methods are provided for interpreting traffic information for a vehicle. Sensor data is collected from at least one first sensor device of the vehicle. At least one relevant object is determined within the sensor data based on a window defined by a plurality of ranges and associated elevations, wherein the plurality of ranges and associated elevations are defined relative to the at least one first sensor device. A confidence score of the at least one relevant object is determined based on an identification of at least one pattern of activity of other objects associated with an intersection. A subset of sensor data is determined from at least one second sensor of the vehicle based on the confidence score of the relevant object. Traffic device data for use in controlling the vehicle is generated based on an evaluation of the subset of sensor data.

20 Claims, 4 Drawing Sheets

(56) References Cited

U.S. PATENT DOCUMENTS

2023/0282004 A1\* 9/2023 Yu .................... G08G 1/096791
  382/104
2023/0382380 A1\* 11/2023 Herrero Zarzosa .. G06V 20/584

OTHER PUBLICATIONS

Levinson et al., "Traffic Light Mapping, Localization, and State Detection for Autonomous Vehicles", 2011 (Year: 2011).\*

\* cited by examiner

METHODS AND SYSTEMS FOR SENSOR FUSION FOR TRAFFIC INTERSECTION ASSIST

The present disclosure generally relates to vehicles, and more particularly relates to the detection and interpretation of traffic devices that regulate the traffic flow of vehicles at intersections.

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

While autonomous vehicles and semi-autonomous vehicles offer many potential advantages over traditional vehicles, in certain circumstances it may be desirable for improved operation of the vehicles. For example, autonomous vehicles detect traffic devices using, for example, image processing of images from one or more of cameras or other image sensors about the vehicle. The autonomous vehicles may also use the images to determine a traffic signal that is emitted from the traffic device. Using high resolution image processing of images from an camera device for determining a traffic device location can be computationally expensive.

Accordingly, it is desirable to provide systems and methods for detecting and interpreting traffic devices that use less computationally expensive means. Furthermore, other desirable features and characteristics of the present disclosure will become apparent from the subsequent detailed description and the appended claims, taken in conjunction with the accompanying drawings and the foregoing technical field and background.

SUMMARY

Systems and methods are provided for interpreting traffic information for a vehicle. In one embodiment, a method includes: collecting, by a processor, sensor data from at least one first sensor device of the vehicle; determining, by the processor, at least one relevant object within the sensor data based on a window defined by a plurality of ranges and associated elevations, wherein the plurality of ranges and associated elevations are defined relative to the at least one first sensor device; determining, by the processor, a confidence score of the at least one relevant object based on an identification of at least one pattern of activity of other objects associated with an intersection; determining, by the processor, a subset of sensor data from at least one second sensor of the vehicle based on the confidence score of the relevant object; and generating, by the processor, traffic device data for use in controlling the vehicle based on an evaluation of the subset of sensor data.

In various embodiments, the method includes identifying a cross-traffic pattern of objects within the range of the at least one relevant object as the at least one pattern of activity.

In various embodiments, the method includes building a hysteresis based on the identified cross-traffic pattern of objects, and wherein the determining the confidence score is based on the hysteresis.

In various embodiments, the method includes identifying at least one of an acceleration pattern of objects and a deceleration pattern of objects within the range of the at least one relevant object as the at least one pattern of activity.

In various embodiments, the method includes building a hysteresis based on the identified at least one of acceleration pattern of objects and deceleration pattern of objects, and wherein the determining the confidence score is based on the hysteresis.

In various embodiments, the window is further defined based on at least one of a road grade and a geographic location.

In various embodiments, the window is updated based on a confirmation of the traffic device data.

In various embodiments, the at least one second sensor is a camera device.

In various embodiments, the at least one first sensor is a radar device.

In another embodiment, a system includes: a first data storage device that stores at least one window defined by a plurality of ranges and associated elevations, wherein the plurality of ranges and associated elevations are defined relative to at least one first sensor device of the vehicle; and a processor configured to: collect sensor data from the at least one first sensor device of the vehicle; determine at least one relevant object within the sensor data based on the at least one window; determine a confidence score of the at least one relevant object based on an identification at least one pattern of activity of other objects associated with an intersection; determine a subset of sensor data from at least one second sensor of the vehicle based on the confidence score of the relevant object; and generate traffic device data for use in controlling the vehicle based on an evaluation of the subset of sensor data.

In various embodiments, the processor is further configured to identify a cross-traffic pattern of objects within the range of the at least one relevant object as the at least one pattern of activity.

In various embodiments, the processor is further configured to build a hysteresis based on the identified cross-traffic pattern of objects, and determine the confidence score based on the hysteresis.

In various embodiments, the processor is further configured to identify at least one of an acceleration pattern of objects and a deceleration pattern of objects within the range of the at least one relevant object as the at least one pattern of activity.

In various embodiments, the processor is further configured to build a hysteresis based on the identified at least one of acceleration pattern of objects and deceleration pattern of objects, and determine the confidence score based on the hysteresis.

In various embodiments, the at least one window is defined based on at least one of a road grade and a geographic location.

In various embodiments, the at least one window is updated based on a confirmation of the traffic device data.

In various embodiments, the at least one second sensor is a camera device.

In various embodiments, the at least one first sensor is a radar device.

In another embodiment, a vehicle is provided. The vehicle includes: at least one second sensor configured to sense the environment of the vehicle; a data storage device that stores at least one window defined by a plurality of ranges and associated elevations, wherein the plurality of ranges and associated elevations are defined relative to the at least one first sensor device; and a processor configured to: collect sensor data from the at least one first sensor device of the vehicle; determine at least one relevant object within the sensor data based on the at least one window; determine a confidence score of the at least one relevant object based on an identification at least one pattern of activity of other objects associated with an intersection; and determine a subset of sensor data from the at least one second sensor of the vehicle based on the confidence score of the relevant object; and generate traffic device data for use in controlling the vehicle based on an evaluation of the subset of sensor data.

In various embodiments, the processor of the vehicle is further configured to identify at least one of a cross-traffic pattern of objects, an acceleration pattern of objects, and a deceleration pattern of objects within the range of the at least one relevant object as the at least one pattern of activity and build a hysteresis based on the identified at least one pattern of activity.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
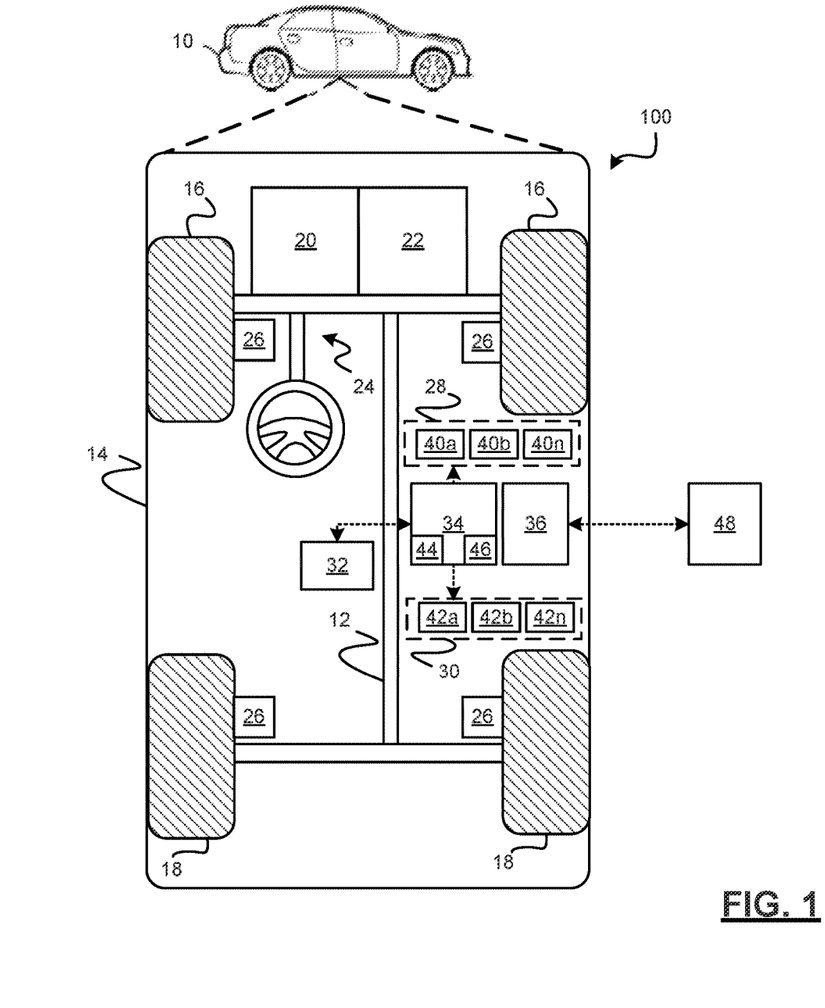
FIG. 1 is a functional block diagram illustrating an autonomous vehicle having a traffic device detection system, in accordance with various embodiments.

With reference to FIG. 1, a traffic device detection system shown generally at 100 is associated with a vehicle 10 in accordance with various embodiments. In general, the traffic device detection system 100 processes data provided by two or more different sensing devices disposed about the vehicle 10 to detect traffic devices and/or the signals that they emit more efficiently. In various embodiments, as will be discussed in more detail below, the two different sensing devices have different resolutions such as a radar device and a camera device. While the exemplary embodiments are discussed in the context of the two sensing devices being a radar device and a camera device, it can be appreciated that other different sensing devices can be implemented in various embodiments.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the traffic device detection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, buses, aircraft, or simply robots, etc., that are regulated by traffic devices can also be used.

In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. As can be appreciated, in various embodiments, the autonomous vehicle 10 can be any level of automation or have no automation at all (e.g., when the system 100 simply presents the traffic device information for display).

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, inertial measurement units, and/or other sensors. As will be discussed in more detail below, in various embodiments, the sensing devices 40a-40n include one or more radar devices that generate radar data and one or more camera devices that generate image data that is used by the traffic device detection system 100.

The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc.

Figure 2:
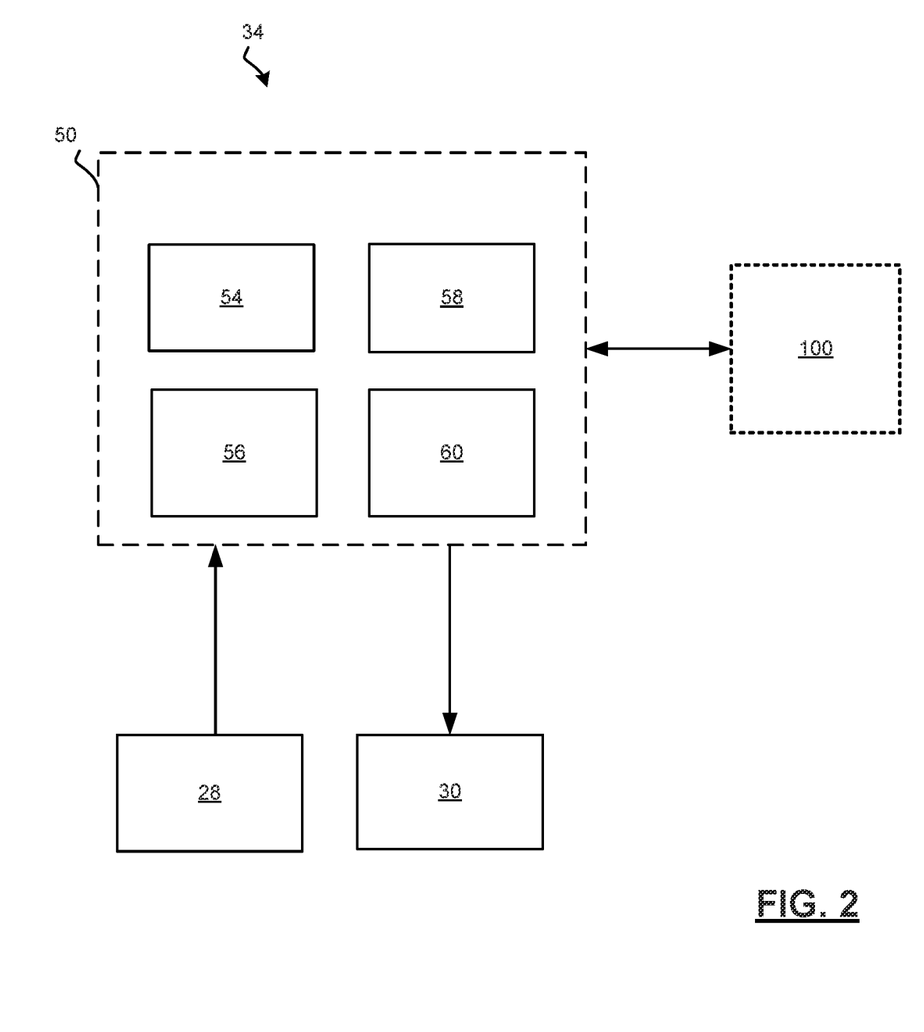
FIG. 2 is a dataflow diagram illustrating an autonomous driving system that includes the traffic device detection system, in accordance with various embodiments.

The communication system 36 is configured to wirelessly communicate information to and from other entities 48, such as but not limited to, other vehicles ("V2V" communication) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

The data storage device 32 stores data for use in automatically controlling the autonomous vehicle 10. In various embodiments, the data storage device 32 stores defined maps of the navigable environment. In various embodiments, the defined maps are built from the sensor data of the vehicle 10. In various embodiments, the maps are received from a remote system and/or other vehicles. In various embodiments, the data storage device 32 stores data identifying the dimensions of the vehicle 10, the locations of the sensing devices 40a-40n relative to the vehicle 10, and/or other extrinsic and/or intrinsic parameters associated with the vehicle 10 and/or sensing devices 40a-40n. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the traffic device detection system 100 and, when executed by the processor 44, integrates real time information from the sensor system 28 and information from the data storage device 32 and outputs traffic device information such as a location and/or a traffic signal state based thereon. The instructions of the controller 34 further make use of the traffic device information in making decisions for and planning upcoming vehicle maneuvers used to navigate the vehicle 10 through the environment and/or to display information to an occupant of the vehicle 10.

As can be appreciated, the controller 34 may be implemented as multiple controllers including at least one residing on the vehicle 10 and at least one residing remote from the vehicle 10. In such embodiments, functions of the traffic device detection system 100 may implemented on any of the controllers 34, including partially on a first controller of the vehicle 10 and partially on a second controller residing, for example, on an entity 48 such as a server system.

As can be appreciated, the subject matter disclosed herein provides certain enhanced features and functionality to what may be considered as a standard or baseline non-autonomous vehicle or an autonomous vehicle 10, and/or an autonomous vehicle based remote transportation system (not shown) that coordinates the autonomous vehicle 10. To this end, a non-autonomous vehicle, an autonomous vehicle, and an autonomous vehicle based remote transportation system can be modified, enhanced, or otherwise supplemented to provide the additional features described in more detail below. For exemplary purposes the examples below will be discussed in the context of an autonomous vehicle.

In accordance with various embodiments, the controller 34 implements an autonomous driving system (ADS) 50 as shown in FIG. 2. That is, suitable software and/or hardware components of the controller 34 (e.g., the processor 44 and the computer-readable storage device 46) are utilized to provide an autonomous driving system 50 that is used in conjunction with vehicle 10.

In various embodiments, the instructions of the autonomous driving system 50 may be organized by function, module, or system. For example, as shown in FIG. 2, the autonomous driving system 50 can include a computer vision system 54, a positioning system 56, a guidance system 58, and a vehicle control system 60. As can be appreciated, in various embodiments, the instructions may be organized into any number of systems (e.g., combined, further partitioned, etc.) as the disclosure is not limited to the present examples.

In various embodiments, the computer vision system 54 synthesizes and processes sensor data and predicts the presence, location, classification, and/or path of objects and features of the environment of the vehicle 10. In various embodiments, the computer vision system 54 can incorporate information from the multiple sensing devices of the sensor system 28, including but not limited to cameras, lidars, radars, and/or any number of other types of sensors.

The positioning system 56 processes sensor data along with other data to determine a position (e.g., a local position relative to a map, an exact position relative to lane of a road, vehicle heading, velocity, etc.) of the vehicle 10 relative to the environment. The guidance system 58 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

In various embodiments, the traffic device detection system 100 of FIG. 1 may be included within the ADS 50, for example, as part of the computer vision system 54 or may communicate with the ADS 50 (e.g., through a communication system) as shown. For example, the traffic device detection system 100 receives data from the computer vision system 54 and provides traffic device information used in decision making by the guidance system 58 and/or the control system 60 to ultimately determine how to control the vehicle 10.

Figure 3:
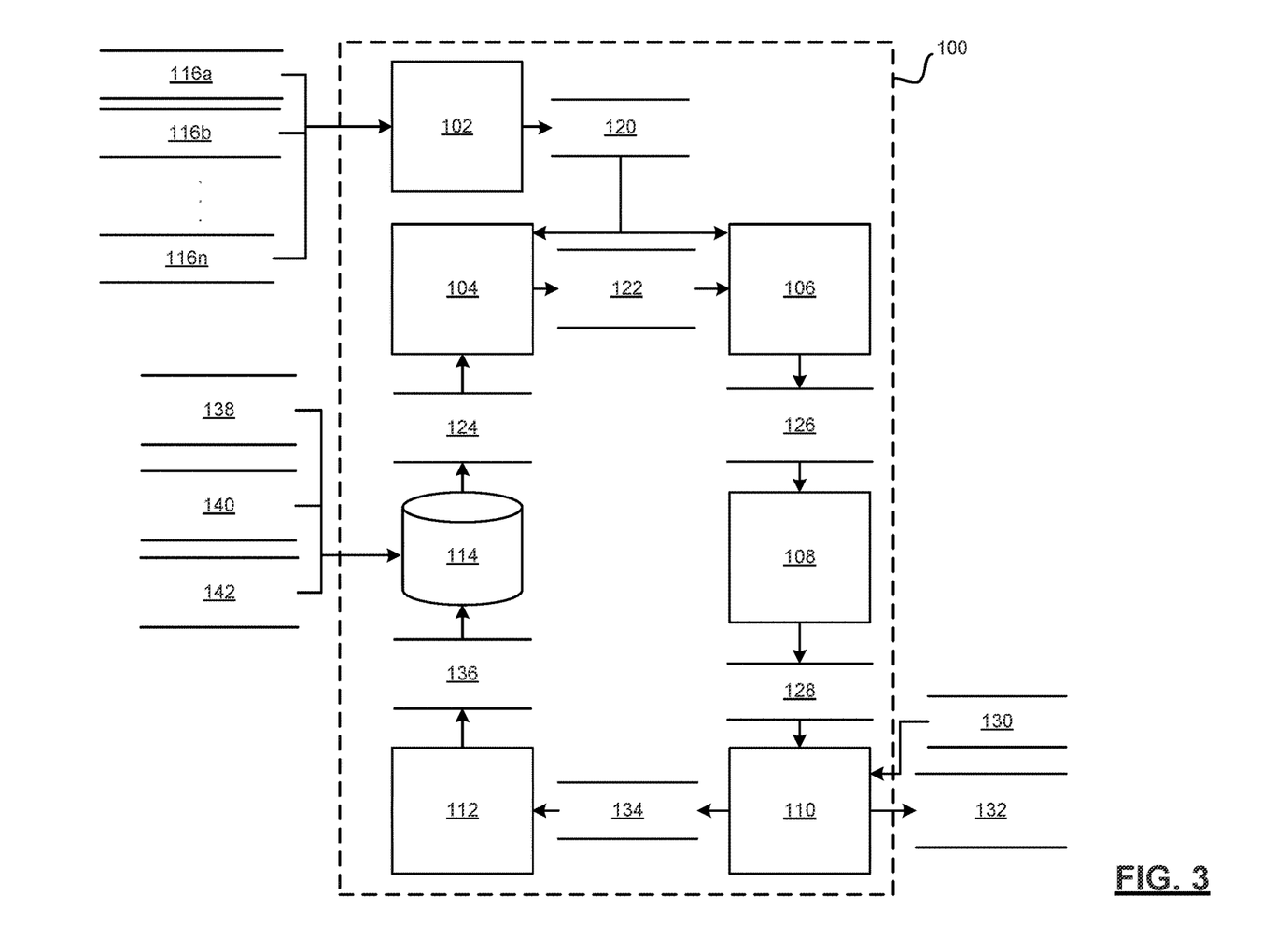
FIG. 3 is a dataflow diagram illustrating the traffic device detection system, in accordance with various embodiments.

As shown in more detail with regard to FIG. 3 and with continued reference to FIGS. 1 and 2, in various embodiments, the traffic device detection system 100 includes a radar data collection module 102, a relevant target detection module 104, a confidence score determination module 106, a grid determination module 108, an image processing module 110, a window data determination module 112, and a window datastore 114.

The window datastore 114 stores window data 124 defining ranges and associated elevations for one or more evaluation windows relative to the radar device where traffic control devices can be commonly found. In various embodiments, the ranges represent distances from the radar device (e.g., radar cross-section (RCS) ranges, or other ranges), and the elevations represent angles relative to the radar device. Typically, as a radar device becomes closer to a traffic control device, the elevation angle increases and the window is defined as such.

In various embodiments, the window may be defined based on the dimensions of the vehicle 10, the position of the detecting radar device relative to the vehicle 10, and/or standard locations/elevations of traffic control devices. In various embodiments, different windows may be defined for different external conditions such as geographic location, road grade, etc. In various embodiments, the defined window(s) may be predefined and stored in the window datastore 114 based on range data 138, elevation data 140, and/or external parameters data 142 and/or may be learned/updated over time based on window data 136.

The radar data collection module 102 receives as input radar data 116a-116n sensed from the environment of the vehicle 10 using one or more of the radar devices. The radar data collection module 102 collects a series of frames (e.g., N frames, where N is equal to eight, nine, or ten), and generates radar data 120 for further processing.

The relevant target detection module 104 receives as input the radar data 120 and window data 124. The relevant target detection module 104 processes the radar data 120 to identify objects within the environment that may be considered as a traffic control devices and generates relevant target data 122 based thereon. For example, the relevant target detection module 104 processes each frame of the collected radar data 120 to identify objects in the environment (e.g., objects other than the ground surface) and then evaluates a position of each of the identified objects with respect to the window over the series of frames. For example, when an identified object falls within the window in each of (or a certain number of) the frames, the relevant target detection module 104 identifies the object as a relevant object and generates relevant target data 122 based thereon.

The confidence score determination module 106 receives as input the radar data 120 and the relevant target data 122. When the relevant target data 122 identifies at least one relevant target in the radar data 120, the confidence score determination module 106 further processes the radar data 120 to determine a hysteresis for the relevant object and a confidence score from the hysteresis and generates confidence data 126 based thereon.

In various embodiments, the confidence score determination module 106 determines the hysteresis and the confidence score based on activity identified within the window or another window having a same or similar range of the relevant object (e.g., in the same or similar range but the elevation below the window) such as activity associated with an intersection including, but not limited to, cross movement patterns of traffic, traffic acceleration or deceleration patterns of traffic, speed and position patterns of traffic, left turn patterns of traffic, and/or right turn patterns of traffic. When patterns of activity are identified within the window, the confidence score determination module 106 builds a hysteresis from the object within the frame.

Once the N frames have been processed, the confidence score determination module 106 computes the confidence score from the determined hysteresis. For example, the set of hysteresis associated with the relevant object is processed using one or more machine learning models to compute the confidence score and a set of points (e.g., points that create a bounding box around the relevant object or objects).

The grid determination module 108 receives as input the confidence data 126. The grid determination module 108 evaluates the confidence data 126 associated with each of the relevant objects and generates grid data 128 based thereon. For example, when the confidence data 126 of a relevant object exceeds a threshold, the grid determination module 108 translates the points associated with the relevant object from the coordinate system of the radar device to the coordinate system of a camera device.

The image processing module 110 receives as input the grid data 128 and image data 130 sensed from the environment of the vehicle 10 using one or more camera devices. In various embodiments, when the image data 130 is obtained from a number of camera devices, image data 130 may be selected from a particular camera device based on the points in the grid data 128.

The image processing module 110 extracts a subset of image data from the image data 130 based on the coordinates identified in the grid data 128 and processes the subset of image data with one or more image recognition methods to confirm whether a traffic control device is present and/or to confirm a current signal of the traffic control device. The image processing module 110 provides traffic control device data 132 based on the results of the confirmation. In various embodiments, the image processing module 110 provides feedback data 134 indicating whether or not the relevant object is confirmed as a traffic object.

The window data determination module 112 receives as input the feedback data 134. The window data determination module 112 provides updated window data 136 to the window datastore 114 using one or more machine learning methods.

Figure 4:
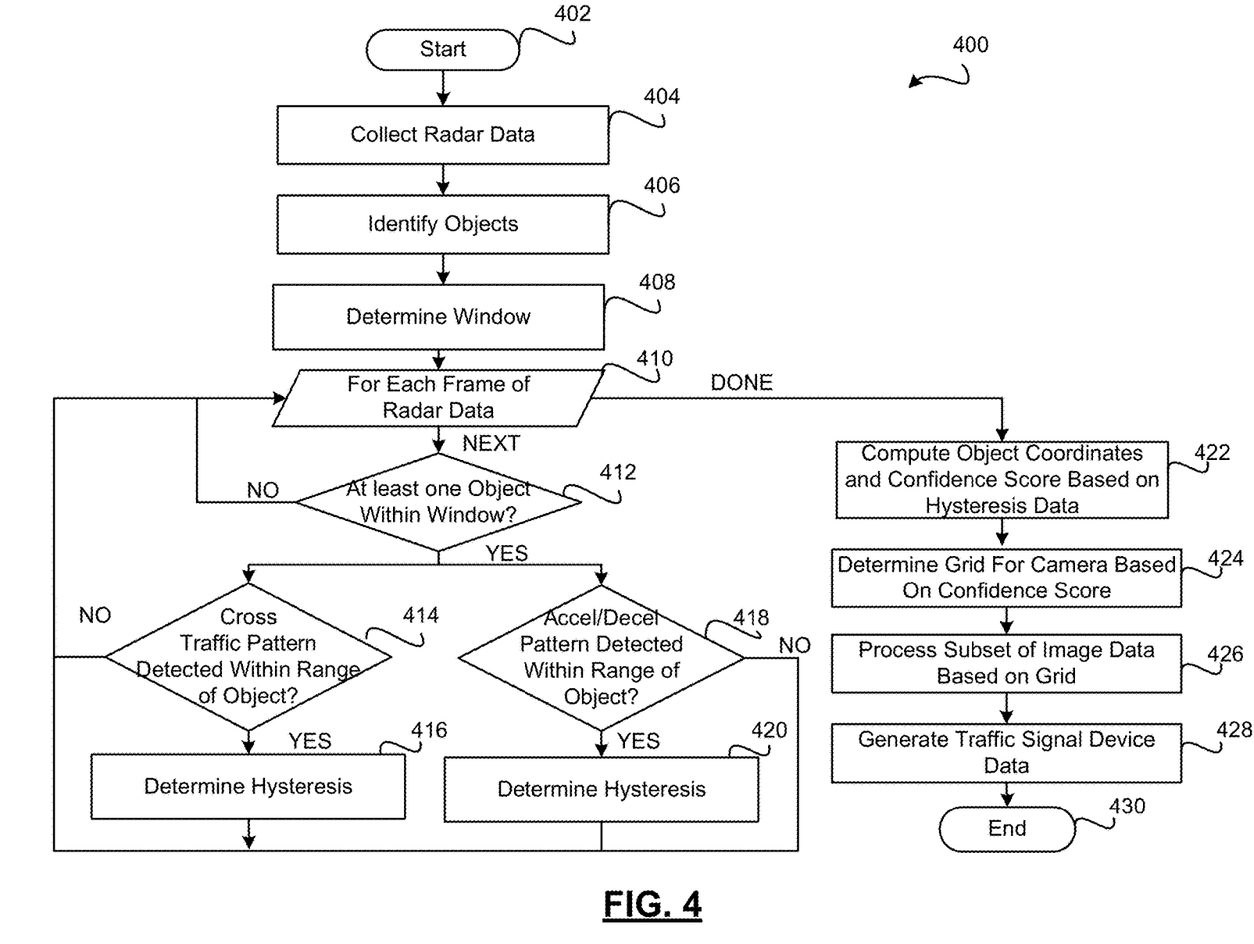
FIG. 4 is a flowchart illustrating a traffic device detection method that may be performed by the traffic device detection system, in accordance with various embodiments.

Referring now to FIG. 4 and with continued reference to FIGS. 1-3, a method 400 for identifying a traffic signal device of an intersection is shown in accordance with various embodiments. As can be appreciated, in light of the disclosure, the order of operation within the method 400 is not limited to the sequential execution as illustrated in FIG. 4 but may be performed in one or more varying orders as applicable and in accordance with the present disclosure. In various embodiments, one or more steps of the methods 400 may be removed or added without altering the spirit of the method 400.

In one example, the method may begin at 402. The radar frame data 116a-116n is collected for N number of frames (e.g., eight, nine, ten, or some other number) at 404. Objects are identified within each frame of the radar frame data 120. A window (or windows) is determined, for example, based on the vehicle/radar parameters and/or external parameters at 408.

Each frame of the radar data 120 is processed at 410-420 to determine if the identified objects are relevant objects, that is, objects that may potentially be a traffic control device. For example, for each frame of the N number of frames at 410, the identified objects are processed to determine if the object falls within the range and associated elevation defined by the window at 412. For any object that falls within the window at 412, patterns of activity of other objects identified within the window or another associated window of the object (e.g., at a lower elevation) are evaluated at 414 and 418. When a certain pattern such as a cross traffic pattern is identified at 414, a hysteresis is built from the object location at 416. Similarly, when another certain pattern such as an acceleration or deceleration pattern is identified at 418, a hysteresis is built from the object location at 420. As can be appreciated, other patterns of activity associated with an intersection such as, but not limited to, left turn patterns, right turn patterns, speed and position patterns, etc. can be evaluated in addition to or as an alternative to the patterns discussed at 418 and 420.

Once the N frames have been processed at 410, confidence scores are computed from the determined set of hysteresis at 422. For example, the set of hysteresis associated with the relevant object is processed using one or more machine learning models to compute a set of points (e.g., point that create a bounding box around the relevant object or objects) and an associated confidence score.

Thereafter, based on the confidence score (e.g., when the confidence score exceeds a threshold), the set of points is translated into a grid of image coordinates associated with image data sensed of the environment at 424. Image processing is performed on a subset of image data identified using the grid at 426. Traffic signal device data is generated based on the image processing at 428. Thereafter, the method may end at 430.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for interpreting traffic information by a vehicle, comprising:
   collecting, by a processor, sensor data from at least one first sensor device of the vehicle;
   determining, by the processor, at least one relevant object within the sensor data based on a window defined by a plurality of ranges and associated elevations, wherein the plurality of ranges and associated elevations are defined relative to the at least one first sensor device;
   determining, by the processor, a confidence score of the at least one relevant object based on an identification of at least one pattern of activity of other objects associated with an intersection;
   determining, by the processor, a subset of sensor data from at least one second sensor of the vehicle based on the confidence score of the relevant object;
   generating, by the processor, traffic device data for use in controlling the vehicle based on an evaluation of the subset of sensor data, wherein the window is updated based on a confirmation of the traffic device data and;
   implementing, by the processor, an autonomous driving system (ADS) comprising a vehicle control system, wherein the vehicle control system navigates the vehicle based on the traffic device data.

2. The method of claim 1, further comprising identifying a cross-traffic pattern of objects within a range of the at least one relevant object as the at least one pattern of activity.

3. The method of claim 2, further comprising building a hysteresis based on the identified cross-traffic pattern of objects, and wherein the determining the confidence score is based on the hysteresis.

4. The method of claim 1, further comprising identifying at least one of an acceleration pattern of objects and a deceleration pattern of objects within a range of the at least one relevant object as the at least one pattern of activity.

5. The method of claim 4, further comprising building a hysteresis based on the identified at least one of the acceleration pattern of objects and the deceleration pattern of objects, and wherein the determining the confidence score is based on the hysteresis.

6. The method of claim 1, wherein the window is further defined based on at least one of a road grade and a geographic location.

7. The method of claim 1, wherein the at least one second sensor is a camera device.

8. The method of claim 7, wherein the at least one first sensor device is a radar device.

9. A system for interpreting traffic information for a vehicle, comprising:
- a first data storage device that stores at least one window defined by a plurality of ranges and associated elevations, wherein the plurality of ranges and associated elevations are defined relative to at least one first sensor device of the vehicle; and
- a processor configured to:
  - collect sensor data from the at least one first sensor device of the vehicle;
  - determine at least one relevant object within the sensor data based on the at least one window;
  - determine a confidence score of the at least one relevant object based on an identification of at least one pattern of activity of other objects associated with an intersection;
  - determine a subset of sensor data from at least one second sensor of the vehicle based on the confidence score of the relevant object;
  - generate traffic device data for use in controlling the vehicle based on an evaluation of the subset of sensor data, wherein the at least one window is updated based on a confirmation of the traffic device data; and
  - implement an autonomous driving system (ADS) comprising a vehicle control system, wherein the vehicle control system navigates the vehicle based on the traffic device data.

10. The system of claim 9, wherein the processor is further configured to identify a cross-traffic pattern of objects within a range of the at least one relevant object as the at least one pattern of activity.

11. System of claim 10, wherein the processor is further configured to build a hysteresis based on the identified cross-traffic pattern of objects, and determine the confidence score based on the hysteresis.

12. The system of claim 9, wherein the processor is further configured to identify at least one of an acceleration pattern of objects and a deceleration pattern of objects within a range of the at least one relevant object as the at least one pattern of activity.

13. The system of claim 12, wherein the processor is further configured to build a hysteresis based on the identified at least one of the acceleration pattern of objects and the deceleration pattern of objects, and determine the confidence score based on the hysteresis.

14. The system of claim 9, wherein the at least one window is defined based on at least one of a road grade and a geographic location.

15. The system of claim 9, wherein the at least one second sensor is a camera device.

16. The system of claim 15, wherein the at least one first sensor device is a radar device.

17. A vehicle, comprising:
- at least one first sensor device configured to sense an environment of the vehicle;
- at least one second sensor configured to sense the environment of the vehicle;
- a data storage device that stores at least one window defined by a plurality of ranges and associated elevations, wherein the plurality of ranges and associated elevations are defined relative to the at least one first sensor device; and
- a processor configured to:
  - collect sensor data from the at least one first sensor device of the vehicle;
  - determine at least one relevant object within the sensor data based on the at least one window;
  - determine a confidence score of the at least one relevant object based on an identification of at least one pattern of activity of other objects associated with an intersection;
  - determine a subset of sensor data from the at least one second sensor of the vehicle based on the confidence score of the relevant object;
  - generate traffic device data for use in controlling the vehicle based on an evaluation of the subset of sensor data, wherein the at least one window is updated based on a confirmation of the traffic device data; and
  - implement an autonomous driving system (ADS) comprising a vehicle control system, wherein the vehicle control system navigates the vehicle based on the traffic device data.

18. The vehicle of claim 17, wherein the processor is further configured to identify at least one of a cross-traffic pattern of objects, an acceleration pattern of objects, and a deceleration pattern of objects within a range of the at least one relevant object as the at least one pattern of activity, and build a hysteresis based on the identified at least one pattern of activity.

19. The vehicle of claim 17, wherein the at least one window is defined based on at least one of a road grade and a geographic location.

20. The vehicle of claim 17, wherein the at least one first sensor device is a radar device and the at least one second sensor is a camera device.

* * * * *